United States Patent [19]

Crane

[11] Patent Number: 4,821,039
[45] Date of Patent: Apr. 11, 1989

[54] DUAL POLARIZED MONOPULSE ORTHOGONAL SUPERPOSITION

[76] Inventor: Patrick E. Crane, 7507 Summerbridge Dr., Tampa, Fla. 33614

[21] Appl. No.: 729,433

[22] Filed: May 1, 1985

[51] Int. Cl.[4] ............................................. G01S 13/44
[52] U.S. Cl. ..................................... 342/153; 342/149
[58] Field of Search ........................ 342/149, 188, 153

[56] References Cited

U.S. PATENT DOCUMENTS

| | | | |
|---|---|---|---|
| 3,359,555 | 12/1967 | Taylor | 342/149 X |
| 3,540,045 | 11/1970 | Taylor | 342/149 |
| 3,568,190 | 3/1968 | Wong | 342/149 |
| 3,728,726 | 4/1973 | Howard | 342/153 |
| 3,789,407 | 1/1974 | Rosa et al. | 342/149 |
| 3,936,838 | 2/1976 | Foldes | 342/153 |
| 4,213,130 | 7/1980 | Vaesser | 342/149 |
| 4,231,037 | 10/1980 | Long | 342/149 |
| 4,329,687 | 5/1982 | Kloeuekorn et al. | 342/188 |
| 4,387,373 | 6/1983 | Lonjuemore, Jr. | 342/149 |
| 4,499,473 | 2/1985 | Rao | 342/188 |
| 4,568,940 | 2/1986 | Diamond | 342/149 |

*Primary Examiner*—Thomas H. Tarcza
*Assistant Examiner*—Mark Hellner
*Attorney, Agent, or Firm*—James Creighton Wray

[57] ABSTRACT

Two distinctly polarized monopulse signals are orthogonally superimposed using antennas spaced in pairs which are transversely aligned. Signals from the pairs are separately summed and differentiated. Signals from both pairs are summed in one system. A transmitter supplies pulses directly to one pair and through a 90° phase shifter to the other pair.

37 Claims, 4 Drawing Sheets

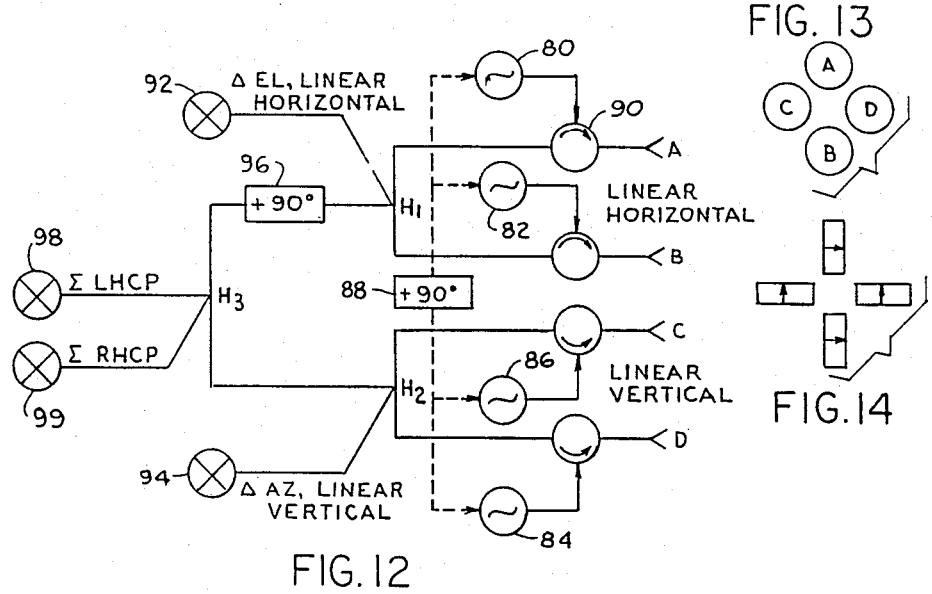
FIG. 12
FIG. 13
FIG. 14
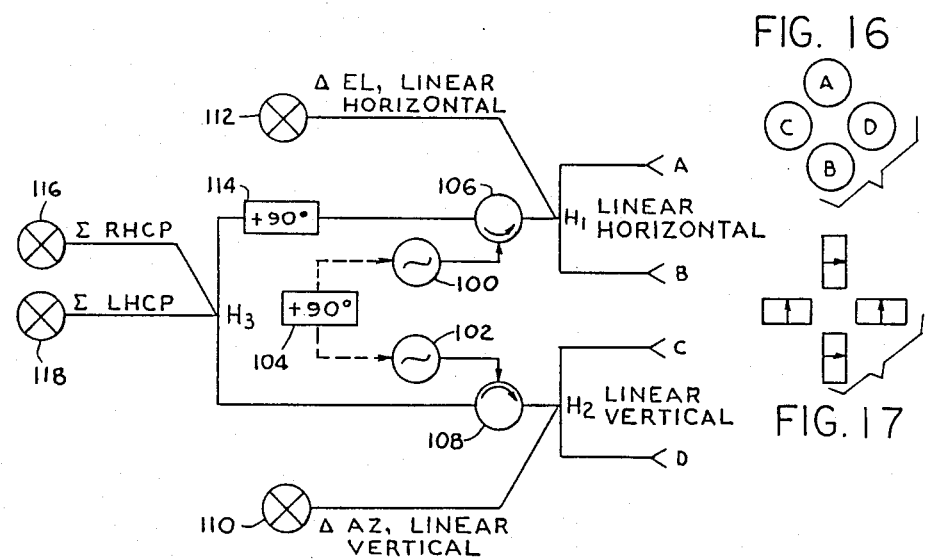
FIG. 15
FIG. 16
FIG. 17

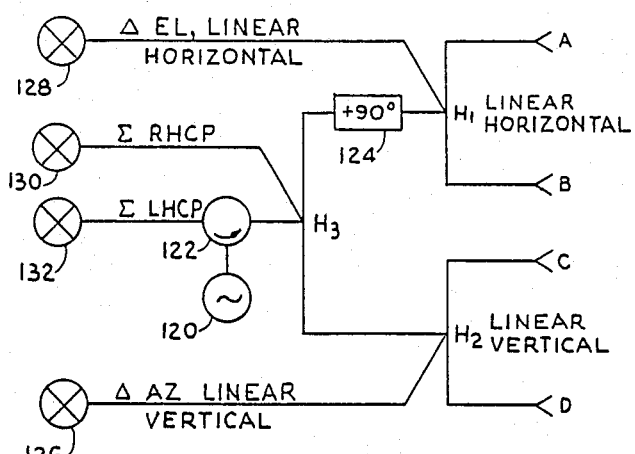
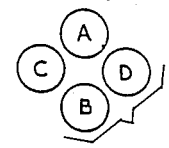
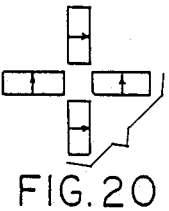
FIG. 18
FIG. 19
FIG. 20
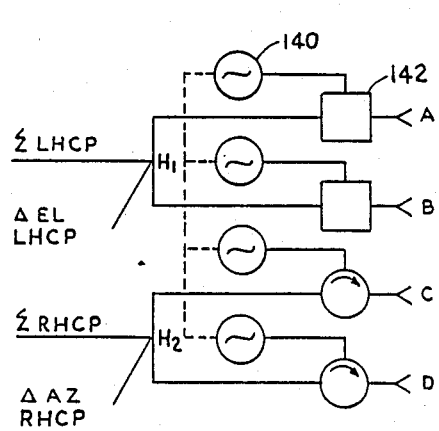
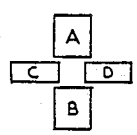
FIG. 21
FIG. 22
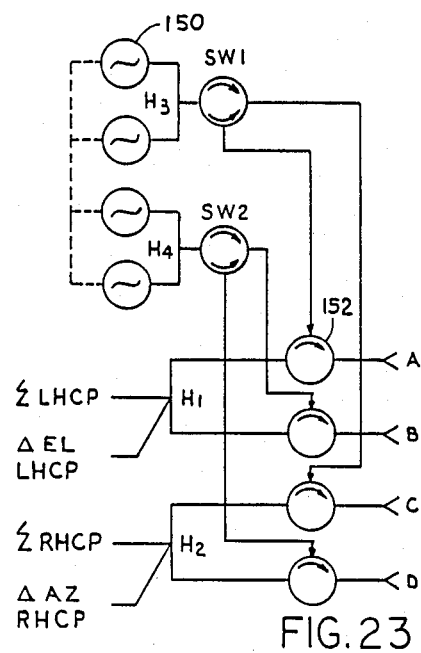
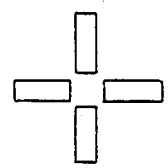
FIG. 23
FIG. 24

DUAL POLARIZED MONOPULSE ORTHOGONAL SUPERPOSITION

BACKGROUND OF THE INVENTION

The present invention relates to target and relative positional change sensing. Particularly, the invention relates to monopulse systems having multiple antenna feeds and one or more signal sources.

Problems exist with known monopulse radar systems. Large numbers of parts are required. Each part increases cost of production, size and weight of the system and requires increased power and fuel in a vehicle. Each added part increases possibilities of malfunction in use or errors in assembly. An increased number of parts requires increased power and produces increased heat, which may adversely affect other parts or devices and which may adversely affect vehicle size, range or operational characteristics.

In the past, radars which have been built have been blind to one sense of polarization or another in the return signal. As a consequence, any target which is strongly polarized has the potential of being invisible, regardless of its amplitude. Even if a target has a strong reflection coefficient, if the target happens to be predominantly odd bounce, even bounce or linear, there exists a good possibility that a radar cannot see it.

Dual polarized systems have been touted primarily because of their properties regarding signal to clutter enhancement or improved target classification and identification. Dual polarization processing antennae systems receive dual polarization on their sum channels. Most have single polarization on their difference channels. If the target return is strongly polarized in one sense which is orthogonal to the difference channel polarization, the target cannot be tracked even though detected unless the transmitter can be switched from one sum channel to the orthogonally polarized sum channel. The unattractive alternatives are to provide two additional receiver channels for difference patterns or to switch two receivers between orthogonally polarized difference channels.

There has arisen in conjunction with dual polarized technology a requirement to track a target regardless of its polarization characteristic. That requirement may be referred to as a universal tracking requirement. Universal tracking capability cannot be provided even by the most sophisticated of singly polarized radars, nor is it present in any radar which transmits a single polarization and receives a single polarization. It does not matter whether such radars are co-polar or cross-polar. For any such radar, a return signal which is orthogonal to the polarization of the tracking channels cannot be seen at all. Only in a dual polarized, polarization diverse system can this be achieved.

A monopulse system is desirable for tracking applications because of performance. Reasons for using any other tracking system lie in the domain of practicality. If a monopulse system can be provided as inexpensively and as low in risk as an alternative system, a monopulse system is preferable.

The present invention provides a reduction of parts in monopulse systems in an unobvious manner to lower costs and lower risks. As a result of the present invention, other tracking systems can be disregarded for most system applications.

SUMMARY OF THE INVENTION

The present invention solves problems that exist in the prior art by providing monopulse radar systems with reduced parts and, thus, reduced expense, and increased reliability, reduced size and increased flexibility in use.

The present invention provides dual polarized multimode radar systems which have reduced parts and increased reliability, reduced size and increased operational capabilities. Two singleplane monopulse patterns which are orthogonal to each other, both in monopulse pattern characteristics and in polarizations. It does not matter which polarizations are used as long as they are orthogonal.

In the simplest form of the present invention, only two hybrids are integrated with two pairs of singly polarized feeds.

The invention provides a method of detecting objects with radar signals, which creates dual polarized monopulse radar signals from orthogonally superpositioned feed clusters in continuous aperture radar antennae or distribution networks in phased arrays.

Preferably, the feeding comprises feeding signals having a first polarization from first and second spaced feeds or networks which are linearly oriented and feeding second signals of a distinct polarization from third and fourth spaced feeds or networks which are linearly oriented in a direction orthogonal to the linear orientation direction of the first and second feeds or networks.

Throughout the specification means for sending and receiving signals are referred to as feeds, feed clusters, networks and antennae, whether planar, parabolic or other are used interchangeably and may be considered as interchangeable and may be referred to as signal means, sending means, means for sending signals or simply means.

A preferred embodiment creates a signal of circular polarization in one sense of rotation from the first and second sending means and creates a signal of circular polarization in an opposite sense of rotation from the second and third sending means.

In one embodiment the transmitting comprises sending signals of a first linear orientation from the first and second means and sending signals of a second different linear orientation in the third and fourth means.

A preferred embodiment power divides a signal between the first and second means and the third and fourth means.

The preferred method further sums return signals from signals transmitted by the first and second means and differentiates signals returned from the first and second means, sums return signals from the third and fourth means and differentiates signals received from the third and fourth means.

In a preferred form of the invention first and second means are arranged in vertically spaced positions. Third and fourth means are placed in horizontally spaced positions. Differences in azimuth are determined by differentiating signals returned from the third and fourth means.

A preferred embodiment conducts a signal from a transmitter, to a first spaced linearly oriented pair of signal means, phase shifts the signal and conducts the phase-shifted signal to a second pair of signal means.

One embodiment sums return signals from all of the signal means and differentiates return signals from the first pair of signal means and separately differentiates return signals from the second pair.

In one form, the invention generates a signal, conducts the signal to a first pair of spaced linearly oriented feeds, phase shifts the signal and conducts the phase-shifted signal to a second pair of spaced linearly oriented feeds. Return signals are summed from the first and second feeds. Return signals from the first and second feeds are differentiated as changes in linear position. Return signals from the second and third feeds are summed and differentiated as changes in position in the orthogonal direction.

In one embodiment signals of a first polarization are transmitted from first and second feeds, and signals of opposite polarization are transmitted from the third and fourth feeds. Return signals from the first and second feeds are summed and are differentiated as changes in elevation. Return signals from the third and fourth feeds are summed and are differentiated as changes in azimuth.

The invention provides signals circularly polarized in one sense of direction from first and second feeds, provides signals circularly polarized in an opposite sense of direction and signals linearly polarized in an orthogonally related sense of direction from third and fourth feeds, differentiates linearly polarized signals returned from one set of feeds as changes in elevation and differentiates linearly polarized signals returned from another set of feeds as changes in azimuth and separately sums circularly polarized return signals from both sets of feeds.

One embodiment creates a source signal, conducts the source signal to a 90-degree phase shifter and conducts the phase-shifted signal to a first set of feeds, linearly polarizes the signal from the first set of feeds, conducts the signal to a second set of feeds and linearly polarizes the signal therefrom in an orthogonally related sense of direction, circularly polarizes signals from the first set of feeds in a first sense of rotation and circularly polarizes signals from the second set of feeds in a second opposite sense of rotation. Linearly polarized returning signals from the first set of feeds are differentiated and are received as signals of first positional change information. Return linearly polarized signals from the second set of feeds are differentiated and received as signals of change in a second positional information. Circularly polarized return signals in the first sense of rotation and circularly polarized return signals in the second sense of rotation are separately summed.

One embodiment of the invention provides signals from first and second sources respectively to first and second phase shifters, provides phase-shifted signals from the first and second phase shifters to first and second feeds and provides signals from third and fourth sources to third and fourth feeds respectively, thereby creating signals having circular polarization in opposite senses of directions from the first and second feeds and from the third and fourth feeds respectively. Return signals from the first and second feeds are summed and are differentiated as changes in a first position information. Return signals from the third and fourth feeds are summed and are differentiated as changes in another positional information.

The invention may be practiced with distribution networks in phased arrays.

The invention provides dual polarization which is achieved by superposition in orthogonally directions of singly polarized A and E monopulse patterns which are linearly polarized in orthogonally related directions or which are circularly polarized in opposite directions. Polarizations may be periodically altered.

The above and other objects and features of the invention are apparent in the disclosure which includes the above and ongoing written description, including the claims and the drawings.

BRIEF DESCRIPTION OF THE DRAWINGS

FIG. 12 shows a preferred modified dual polarized monopulse system.

FIGS. 13 and 14 show feed clusters for the system of FIG. 12.

FIG. 15 shows a two source spacial combination dual polarized monopulse system of the present invention.

FIGS. 16 and 17 show feed clusters for use with the system of FIG. 15.

FIG. 18 shows a modified dual polarized monopulse system of the present invention.

FIGS. 19 and 20 show feed clusters for use with the system of FIG. 18.

FIG. 21 shows a four source system constructed according to the present invention.

FIG. 22 shows a feed cluster used with the four source system shown in FIG. 21.

FIG. 23 shows a four source system.

FIG. 24 shows a feed cluster for use with the system of FIG. 23.

DETAILED DESCRIPTION OF THE DRAWINGS

Figure 1:
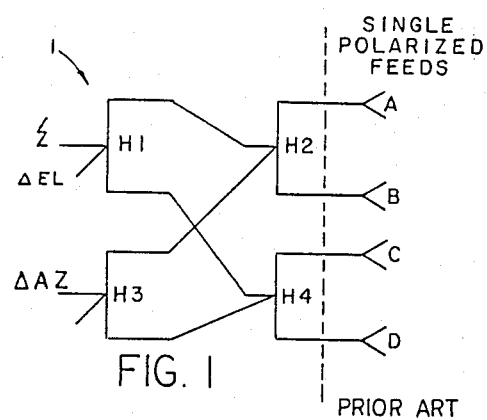
FIG. 1 shows prior art matched hybrid tees for generating a monopulse pattern in a singly polarized system.
Figure 2:
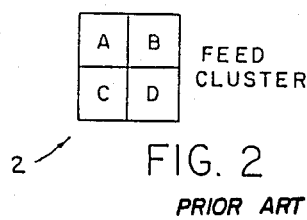
FIG. 2 shows a prior art feed cluster related to FIG. 1.

A prior art singly polarized system is generally represented by the numeral 1 in FIG. 1. The system has four hybrid tees, H1, H2, H3 and H4 which supply single polarized feeds, A, B, C and D arranged in a feed cluster 2 as shown in FIG. 2.

Figure 3:
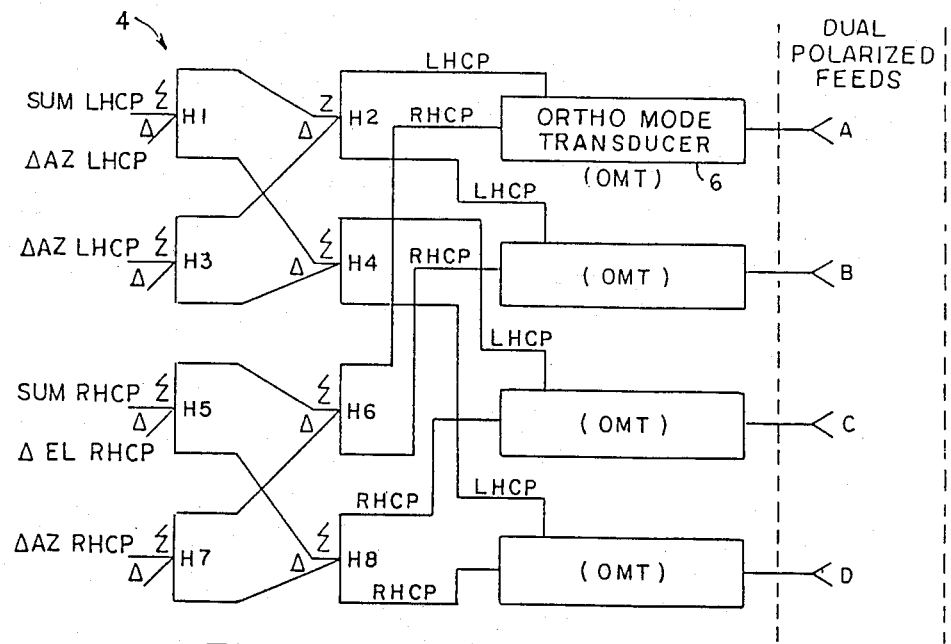
FIG. 3 shows a prior art device in which the system of FIG. 1 has been converted to dual polarization.
Figure 4:
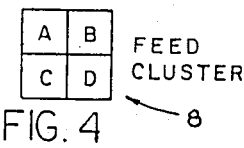
FIG. 4 shows the prior art feed cluster for the system of FIG. 2.

The system shown in FIG. 3 is a prior art dual polarized system 4 which uses eight hybrid tees, H1-H8, and four orthomode transducers 6 which supply the signals to the dual polarized feeds A, B, C and D in the feed cluster 8 as shown in FIG. 4.

Figure 5:
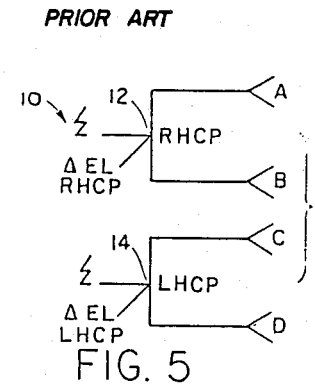
FIG. 5 shows a system of the present invention which has two hybrids integrated with two pairs of singly polarized feeds.
Figure 6:
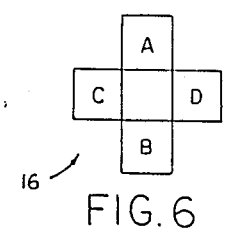
FIG. 6 shows the feed cluster for the system of FIG. 5.

FIG. 5 shows a recommended system 10 of the present invention using two hybrid tees 12 and 14 for providing right hand circular polarization from feeds A and B and left hand circular polarization from feeds C and D arranged in a cluster 16 as shown in FIG. 6. Polarization may be circular or linear, using the same system 10 as disclosed in FIG. 5.

When the cluster is combined in a multimode structure using $TE_{01}$ and $TE_{02}$ modes for one polarization and $TE_{10}$ and $TE_{20}$ for the other polarization, a superior monopulse system results evens for conventional single polarization systems.

Possible switching combinations take into account the fact that complex target centroids differ between orthogonal polarizations. Switching transmit polarizations can average out that phenomenon.

Figure 7:
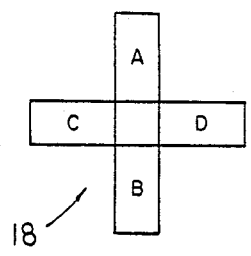
FIG. 7 shows a linear polarized feed cluster.
Figure 8:
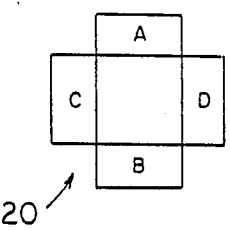
FIG. 8 shows an alternate linear polarized feed cluster.
Figure 9:
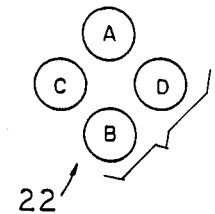
FIG. 9 shows a circular polarized feed cluster.

Feed cluster configurations 18, 20 and 22 shown in FIGS. 7, 8 and 9 are useful with the system 10 as shown in FIG. 5.

In FIG. 7, A and B provide horizontally polarized signals, and C and D provide vertical polarization. In FIG. 8, the reverse is true. In FIG. 9, circular polarization is provided in one sense of rotation in A and B and in the other sense in C and D.

Figure 10:
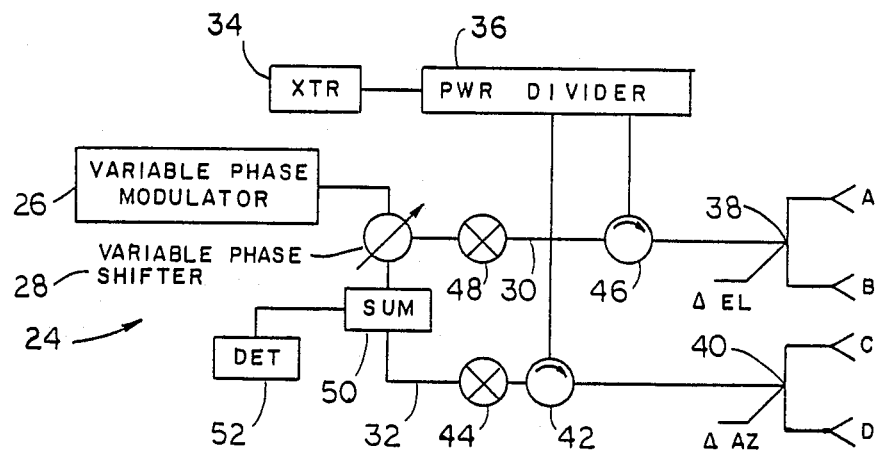
FIG. 10 shows a system of the present invention using a power divided signal which generates a return signal in which none of the target return is lost due to complex target polarization rotation.

Transmitting a power divided signal with the system 24 as shown in FIG. 10 provides for the generation of the return signal in which none of the target return is lost due to complex target polarization rotation. Signal to clutter enhancement is produced by the system 24. A variable phase modular 26 supplies a signal to variable phase shifter 28. A transmitter 34 connected to a power divider 36 supplies power via circulators 46 and 42 to hybrids 38 and 40, which are connected respectively to feeds A and B and C and D. Returning signals are differentiated to provide change in elevation and azimuth, are conducted through the circulators 42 and 46 through lines 32 and 30 into mixers 44 and 48 and are summed 50 and detected 52.

Figure 11:
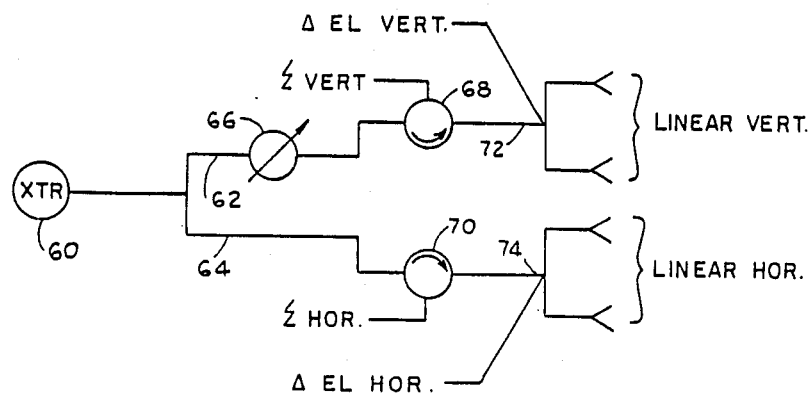
FIG. 11 shows a dual polarized monopulse system.

In FIG. 11, transmitter 60 supplies signals to two lines 62 and 64. Phase shifter 66 is provided in line 62. The signals are supplied through circulators 68 and 70 to hybrid tees 72 and 74. Feeds attached to hybrid tee 72 provide vertical polarized signals and feeds attached to hybrid tee 74 provide horizontally polarized signals. Return signals received in the antennas are differentiated to provide a signal of change in elevation from the vertically polarized signals returned through hybrid tee 72. Horizontally polarized return signals provide signals of delta elevation from the different port in hybrid tee 74. Return signals in vertical polarization are summed from the circulator 68. Circulator 70 passes returned horizontally polarized signals, which are summed.

A preferred form of the invention is shown in FIG. 12. Paired transmitters 80, 82 and 84, 86 are operated 90 degrees out of phase by phase shifter 88. The signals are conducted from the transmitters via circulators 90 to antennas A, B, C and D.

Antennas A, B, C and D are orthogonally superpositioned in the manner shown in FIGS. 13 or 14. Return signals from the antennas A and B are passed through circulators 90 into hybrid tee H1. The signal from the delta port is feed to a mixer 92 to provide a change in elevation signal from the linear horizontally polarized return. Return signals from antennas C and D pass through the associated circulators to hybrid tee H2 whose delta port is feed to a mixer 94 to produce a azimuth change signal from the linearly or vertically polarized return. Phase shifter 96 shifts the phase from the sum port of hybrid tee H1, and the signals from the hybrid tee H1 and H2 are conducted to a hybrid tee H3 which separates left hand circular polarization and right hand circular polarization signals and conducts them to mixers 98 and 99. The four source spacial combination shown in FIG. 12 transmits left hand circular polarization and right hand circular polarization signals and receives the sum of the left hand circular polarization and sum of the right hand circular polarization. The sum of vertical linear and horizontal linear polarization signals is also available. The system receives delta azimuth linear vertical polarization signals and delta elevation linear horizontal polarization signals.

FIG. 15 shows a two source spacial combination which transmits left hand circular polarization or right hand circular polarization and receives the sum of left hand circular polarization and the sum of right hand circular polarization. Sum channels are also available in linear horizontal and linear vertical polarization return signals.

The system in FIG. 15 detects delta azimuth information from differentiated linear vertical polarization signals and detects delta elevation information from differentiated signals having linear horizontal polarization. Transmitters 100 and 102 are keyed 90 degrees out of phase by phase shifter 104. Transmitter signals are conducted via circulators 106 and 108 and hybrid tees H1 and H2 respectively to pairs of antennas A and B and C and D, arranged in the arrays shown in FIGS. 16 and 17. Linear vertically polarized return signals from antennas C and D are taken from the delta port of H2 and are supplied to mixer 110 to provide an azimuth change signal. Return signals from antennas A and B are taken from the delta port of hybrid tee H1 and are supplied to mixer 112 to produce change of elevation signals from linear horizontally polarized return signals from the difference port.

Summed polarized return signals from antennas A and B pass through hybrid tee H1 and through circulator 106 and are phase shifted at 114. Return signals from antennas C and D and hybrid tee H2 pass through circulator 108 to hybrid tee H3 from H1 where they are added to the phase shifted signals. Right hand circularly polarized signals are summed at the difference port and are sensed by mixer 116. Left hand circularly polarized signals are taken from the sum port of hybrid tee H3 and are detected at mixer 118.

Referring to FIG. 18, a single transmitter 120 provides signals through a circulator 122 and a hybrid tee H3 to hybrid tee H2 and through a phase shifter 124 to hybrid H1. The signals are then feed to pairs of antennas A and B and C and D in one of the arrays shown in FIGS. 19 and 20.

Return signals from antennas C and D pass through hybrid tee H2 and the linearly vertically polarized return signals are taken from difference port and detected in mixer 126 to provide signals of change in azimuth.

Return signals from antennas A and B are taken from the difference port of hybrid tee H1 to provide signals of elevational change in mixer 128. Return signals from the sum port of hybrid tee H1 are phase shifted 124 before combining at hybrid tee H3 with summed return signals from antennas C and D. The difference port of H3 provides summed right hand circular polarized signals which are detected at mixer 130. Summed signals from hybrid tee H3 pass through circulator 122 to mixer 132.

In an alternate form of the invention shown in FIG. 21, transmitters generally indicated by the numeral 140 individually supply signals to antennas A, B, C and D. Signals to antennas A and B are phase shifted 90 degree by phase shifters 142. Return signals from antennas A and B are summed and differenciated in hybrid H1.

Return signals from antennas C and D are conducted into hybrid tee H2. The antennas array of A, B, C and D is as shown in FIG. 22.

Referring to FIG. 23, transmitters 150 supply signals through tees H3 and H4 to switches SW1 and SW2 which respectively alternatively supply signals to antennas A and C and to antennas B and D through circulators generally referred to by the numeral 152. Return signals from antennas A and B are summed and differentiated at hybrid tee H1, and return signals from C and D are summed and differentiated at hybrid tee H2. The antenna array is as shown in FIG. 24.

The present invention provides orthogonal superpositioning of monopulse patterns in dual polarized two plane monopulse radar systems.

The present system achieves the high performance of monopulse tracking systems uniquely with reduced expense and lower risk of system malfunction.

Polarization processing antennas have received dual polarization on their sum channels. However, most receive single polarization on their difference channels. Because of that, if a target return is strongly polarized in one sense, which is orthogonal to the difference channel polarization, the target cannot be tracked even though detected unless the transmitter can be switched from one summed channel to the orthogonally polarized summed channel. Unattractive alternatives have been to provide two additional receiver channels for difference patterns with a switch for switching the two receivers between orthogonally polarized difference channels.

The present system makes new requirements of universal tracking, which is the requirement to track a target regardless of its polarization characteristics. In the absense of a requirement for power combining multiple transmitter sources, it is most cost effective to switch transmitter polarization by switching between orthogonally polarized sum channels. In the presense of our requirement for combining power sources, it is also desirable to switch transmitter polarization. Some approaches at universal tracking may use a high number of parts which results in higher degrees of complexity, risk and nonrecurring and recurring costs. One example, such as shown in FIG. 3 when used with a single source employs 8 hybrids, 4 orthomode transducers, one switch, two circulators for a total of 15 parts. In such a system with two spacial sources, an additional switch and two additional circulators are used, raising the part total to 18. When such a system is used with 4 spacial sources, 3 additional switches and 6 additional circulators might be used, raising the part total to 24. When such a device is used with 4 sources, 2 spacial and 2 network, an additional 2 hybrids, 1 switch and 2 circulators are used raising the part total to 20. The use of 15 to 20 parts introduces high degrees of complexity, risk and cost in such a system in which transmit polarization is switched and difference channels receive one sense only, either left hand circulator polarization or right hand circulator polarization with 2 sum channels which receive left and right polarization, 2 delta azimuth channels which receive left and right polarization and two delta elevation channels which receive left and right hand polarization.

In another device, a two plane dual polarized monopulse system transmits single circular polarization and switches delta receivers between left and right hand circular polarization. The device has two sum channels which receive both left and right hand circular polarization, two delta azimuth channels and two delta elevation channels which each receive both left and right hand circular polarization. When that system is used with a single source, 8 hybrids, 4 orthomode transducers, 2 switches and 1 circulator are required for part total of 15. When that system is used with two spacial sources, one more circulator is needed raising the part total to 16. When that system is sued with 4 spacial sources, 3 additional circulators are required, raising the part total to 18. When the device is used with 4 sources, 2 spacial and 2 network, an additional hybrids and 1 circulator are required raising the part total to 18.

Another 2 plane dual polarized monopulse system transmits single circular polarization and receives all 4 delta channels, some continuously, and 2 sum channels receive left and right hand polarization and 2 delta azimuth channels receive left and right hand polarization and 2 delta elevation channels receive left and right hand polarization. When a single source is used, two receivers, 8 hybrids, 4 orthomode transducers and 1 circulator are required, totaling 15 parts. The use of 2 spacial sources requires 1 additional circulator for 16 parts. Four spacial sources require 3 additional circulators for 18 parts. When 4 sources, 2 of which are spacial and 2 network are used, 2 additional hybrids and 1 circulator are required for a total of 18 parts.

The present invention provides dual polarized multimode technology with a number of innovations in dual polarized radars and sensors which are well suited to a wide variety of system approaches. The present invention superpositions 2 single plane monopulse patterns which are orthogonal to each other, both in their monopulse pattern characteristics and then their polarizations. It does not matter which polarizations are picked as long as they are orthogonal.

A radical reduction in parts counts has been achieved. The present invention provides universal tracking with efficient spacial power combining.

In one example of the invention, a two-plane dual-polarized monopulse switches transmitter polarization. Two sum channels receive left and right hand circular polarization. The delta azimuth channel receives left hand circular polarization and a delta elevation channel receives right hand circular polarization.

A single source system uses two hybrids, 1 switch and 2 circulators for a part total of 5. Two sources spacial adds one switch and two circulators for 8 parts. Four sources spacial add two orthomode transducers, 1 switch and 2 circulators for a total of 10 parts. Four sources, 2 spacial and 2 network, add 2 hybrid transistors, 1 switch and 2 circulators for a total of 10 parts.

The present system functions by superposition of orthogonal monopulse patterns and provides ideal monopulse performance for any tracker, provides nearly infinite isolation transmit/receive for FM/CW and makes dual polarization less expensive than single polarization.

The preferred embodiment of the present invention as shown in FIGS. 12, 15 and 18 is a two-plane dual-polarized monopulse system. Transmitter polarization is selectible, either left hand circulator polarization or right hand circulator polarization. Four sum channels receive left hand circulator polarization and right hand circulator polarization. Linear vertical and linear horizontal polarization is also available. The delta azimuth channel receives linear vertical polarization, and the delta elevation channel receives linear horizontal polarization. With a single source such as shown in FIG. 18, 3 hybrids and 1 circulator are used for a total parts count of 4. Using 2 sources spacial as shown in FIG. 15, an additional circulator is required, resulting in 5 total parts.

Using 4 spacial sources requires 3 additional circulators for 7 total parts. Using 4 sources, 2 spacial and 2 network, requires 2 additional hybrids and 1 additional circulator or 7 total parts.

Normalization of the tracked signals is accomplished, if necessary, by the addition of 2 ON/OFF radio frequency switches. This approach is highly versatile and cost effective. Being able to track using linear polarization in the different channels, this is the recommended approach. The only target type which would give it difficulty would be one having a strongly linearly polarized signal aligned very closely with either the horizontal or vertical axis of the antenna. In this case, dithering in one axis could be used to compensate for the loss of null tracking capability. It is believed that either no or few such targets exist when illuminated with a circularly polarized signal.

The particular advantages of the system shown in FIG. 18, for example, is that the quality of circular polarization is adjustable with a single adjustment. This system lends itself to spacial combination of up to 4 sources. Polarization diversity is easily implemented. The parts count is minimum, and the system has a low production cost. The system is believed to have the lowest loss of all the monopulse arrangements.

When the antenna cluster described in the present invention is combined in a multimode structure using $TE_{01}$ and $TE_{02}$ modes for one polarization and $TE_{10}$ and $TE_{20}$ for the other, a superior monopulse is developed, even for conventional single polarization systems.

Switching combinations take into account the fact that complex target centroids may differ between orthogonal polarizations. However, switching transmit polarizations averages out that phenomenon. If one transmits a power divided signal between pairs of the transmitters, as for example, shown in FIG. 10, a return signal is generated in which none of the target return is lost due to complex target polarization rotation. Hence, the signal to clutter ratio is enhanced.

While the invention has been described with reference to specific embodiments, modifications and variations of the invention may be made without departing from the scope of the invention. The scope of the invention is defined in the following claims.

That which is claimed is:

1. The method of detecting objects with radar signals which comprises providing dual polarized, two plane monopulse radar signals by superimposing two single plane monopulse patterns, wherein both single plane monopulse patterns are singly polarized and one of the patterns is orthogonally polarized with respect to the other pattern, and requiring only two sum/difference power dividers for full implementation of the monopulse comparator.

2. The method of claim 1 wherein the providing comprises providing signals having a first polarization from first and second spaced signal sending means which are linearly oriented and providing second signals of a second distinct polarization from third and fourth spaced signal sending means which are linearly oriented in a direction orthogonal to the linear orientation direction of the first and second means.

3. The method of claim 2 wherein the providing comprises providing signals of circular polarization in one sense of rotation in the first and second means and providing signals of circular polarization in an opposite sense of rotation in the second and third means.

4. The method of claim 2 wherein the providing comprises providing signals of a first linear orientation in the first and second means and providing signals of a second linear orientation which is orthogonal to the linear orientation of the first signals in the third and fourth means.

5. The method of claim 2 further comprising:
power dividing a signal between the first and second means and the third and fourth means.

6. The method of claim 2 further comprising:
summing return signals from signals transmitted by the first and second means and differentiating signals returned from signals transmitted by the first and second means, summing return signals from signals transmitted by the third and fourth means and differentiating signals received from signals transmitted by the third and fourth means.

7. The method of claim 2 further comprising:
arranging the first and second means in vertically spaced positions and positioning the third and fourth means in horizontally spaced positions, and further comprising determining differences in elevation by differentiating return signals from signals transmitted by the first and second means and determining change in azimuth by differentiating signals returned from signals transmitted in the third and fourth means.

8. The method of claim 1 further comprising:
conducting a signal from a transmitter, conducting the signal to a first spaced linearly oriented pair of feeds, phase shifting the signal and conducting the phase-shifted signal to a second pair of feeds.

9. The method of claim 8 further comprising:
differentiating and summing return signals from the first pair and differentiating and summing return signals from the second pair.

10. The method of claim 1 further comprising:
creating a signal in a transmitter, power dividing the signal into first and second signals, conducting the first signal to a first pair of outputs, conducting the second signal to a second pair of outputs.

11. The method of claim 10 further comprising:
differentiating return signals from the first pair and separately differentiating return signals from signals fed by the second pair, phase shifting return signals from the one pair and summing signals from the first and second pairs.

12. The method of claim 1 comprising separately generating signals and severally conducting the generated signals to a first pair first and second spaced outputs in linear alignment and to a second pair third and fourth outputs in linear alignment orthogonal to the first pair, controlling output of signals to the first and second pairs in phase shifted relationship.

13. The method of claim 12 further comprising:
differentiating return signals from the first pair and separately differentiating return signals from signals fed by the second pair, phase shifting return signals from the one pair and summing signals from the first and second pairs.

14. The method of claim 1 further comprising:
generating the signals, conducting the signals to a first pair of spaced linearly oriented signal feeds, phase shifting the signals and conducting the phase-shifted signals to a second pair of spaced linearly oriented feeds.

15. The method of claim 14 further comprising:
differentiating return signals from the first pair and separately differentiating return signals from signals fed by the second pair, phase shifting return signals from the one pair and summing signals from the first and second pairs.

16. The method of claim 15 wherein the differentiating signals from the first pair indicates changes in elevation and the differentiating signals from the second pair indicates changes in azimuth.

17. The method of claim 1 comprising:
transmitting signals of a first circular polarization from first and second feeds and transmitting signals of orthogonal polarization from third and fourth feeds, summing return signals from the first and second feeds and differentiating the return signals from the first and second feeds as changes in elevation, summing return signals of the second polarization from the third and fourth feeds and differentiating return signals from the third and fourth feeds as changes in azimuth.

18. The method of claim 1 further comprising:
providing signals from first and second sources respectively to first and second feed, phase shifting signals from third and fourth feeds, providing signals from third and fourth sources to third and fourth feeds respectively, thereby creating signals having circular polarization in variable senses of directions from the first and second feeds and third and fourth feeds, summing return signals from the first and second feeds and differentiating return signals from the first and second feeds as changes in a first positional information, summing return signals from the third and fourth feeds and differentiating return signals from the third and fourth feeds as changes in another positional information.

19. Dual polarized monopulse radar apparatus comprising:
first set of means for radiating, oriented in a first direction,
first means for sending from the first set radar signals of a first polarization,
a second set of means for radiating, oriented in a second direction, wherein the second direction is orthogonal to the first direction,
second means for sending from the second set radar signals of a polarization which is orthogonal to the first polarization, wherein the first and second means comprise source means for creating monopulse radar signals, conducting means for conducting the monopulse radar signals from the source means and wherein the first and second set comprise output means being arranged for sending the monopulse signals in orthogonal superposition,
wherein the output means comprises first plural output means arranged in a first orthogonal axis for sending first monopulse signals and second plural output means arranged in a second axis orthogonal to the first axis for sending second monpulse signals.

20. The apparatus of claim 19 further comprising:
first polarizing means arranged for polarizing the first monopulse signals in first directions and second polarizing means for polarizing the second monopulse signals in second distinct directions.

21. The apparatus of claim 20 further comprising:
pulse signal return means for admitting return signals, summing means connected to the return means for summing return signals and differentiating means connected to the return means for differentiating return signals and detecting means connected to differentiating means associated with return means for admitting return signals of a first polarity for detecting change in a first bearing and detecting means connected to return means for emanating return signals of the second polarity for detecting change in a second bearing direction orthogonally related to the first bearing direction.

22. The apparatus of claim 20 wherein the first polarizing means comprises means for polarizing the first monopulse signals and linear horizontal polarization and wherein the second polarizing means comprises means for polarizing the second monopulse signals and linear vertical polarization.

23. The apparatus of claim 22 wherein the polarizing means provide first monopulse signals with polarization in one sense of rotation and second monopulse signals with polarization in an opposite sense of rotation.

24. Dual polarized monopulse radar apparatus comprising:
first and second transmitting/receiving means in a first linear arrangement and second and third transmitting/receiving means in a second linear arrangement orthogonal to the first linear arrangement, first means for sending from the first and second transmitting/receiving means a first radar pattern of a first polarization, second means for sending from the third and fourth transmitting/receiving means a second radar pattern of a second polarization which is orthogonal to polarization of the first pattern, first conducting means interconnecting the first and second transmitting/receiving means and second conducting means interconnecting the third and fourth transmitting/receiving means, first hybrid tee means having a sum port and a difference port and second hybrid tee means connected to the second conducting means, the second hybrid tee means having a sum port.

25. The apparatus of claim 24 further comprising:
first and second circulators connected to the first conducting means near the first and second transmitting/receiving means and third and fourth circulators connected to the second conducting means adjacent the third and fourth transmitting/receiving means respectively, first, second, third and fourth signal source means respectively connected to the first, second, third and fourth circulators, first control means connected to the first and second source means and second control means connected to the third and fourth source means and 90 degree phase-shift means connected between the first and second control means, third conducting means connected to the sum ports of the hybrid tee means connected to the third conducting means, and 90 degree phase-shift means connected to the third conducting means between one of the sum ports and the third hybrid tee.

26. The apparatus of claim 24 further comprising:
first and second circulators respectively connected to the sum ports of the first and second hybrid tee means, first and second sources respectively connected to the first and second circulators and a 90 degree phase-shifter connected between the first and second sources, a third conducting connected to the first and second circulators and a third hybrid tee connected to the third conducting means and a second 90 degree phase-shifter connected to the third conducting means, a third conducting means connected to sum ports of the first and second hybrid tee means, a third hybrid tee connected to the third conducting means and having a third sum port and a third difference port, a 90 degree phase-shifter connected to the third conducting means, a circulator connected to the third sum port and a signal source connected to the circulator.

27. The apparatus of claim 24 further comprising: first and second 90 degree phase-shifters connected to the first conducting means adjacent the first and second transmitting and receiving means respectively, first and second circulators connected to the second conducting means adjacent the third and fourth transmitting/receiving means respectively, first, second, third and fourth signal sources respectively connected to the first and second shifter and first and second circulator and control means connected to the sources.

28. The apparatus of claim 24 further comprising: first, second, third and fourth circulators respectively connected to the conducting means adjacent the first, second, third and fourth transmitting/receiving means, a first reversing switch connected to the first and third circulators and a second reversing switch connected to the second and fourth circulators, first and second signal sources connected to the first reversing switch and second and third signal sources connected to the second reversing switch and control means connected to the signal sources.

29. The method of claim 1 wherein each of two singly polarized single plane monopulse signals is generated by two feed apertures in combination with one, and only one hybrid, resulting in a total of four feed apertures and two hybrids with no additional supporting network.

30. The method of claim 21 wherein the two apertures connected to a first hybrid are mechanically and electrically isolated from a second hybrid.

31. The method of claim 1, wherein the sum ports of the hybrids are combined through a switch or power divider for the purposes of varying polarization received or transmitted.

32. The method of detecting objects with dual polarized monopulse radar signals radiating monopulse radar signals,
receiving first monopulse radar return signals of a first polarization in first and second feed apertures arranged in a first line,
receiving second monopulse radar return signals of a second polarization orthogonal to the first polarization in third and fourth feed apertures arranged in a second line orthogonal to the first line,
supplying signals from the first and second apertures to a first junction of a first hybrid,
supplying signals from the first and second apertures to a first junction of a first hybrid,
supplying signals from the third and fourth apertures to a second junction of a second hybrid,
summing signals at the first junction in a first sum port of the first hybrid,
summing signals at the second junction in a second sum port of the second hybrid,
differentiating signals at the first junction in a first difference port of the first hybrid as $\Delta EL$,
differentiating signals at the second junction in a second difference port of the second hybrid as $\Delta AZ$.

33. The method of claim 32 wherein the radiating comprises providing dual polarized two plane monopulse radar signals through the superposition of two single plane monopulse patterns which are singly polarized and which are orthogonally polarized.

34. The method of claim 33 wherein the providing comprises providing a first singly polarized single plane monopulse signal from the first and second feed apertures and providing a second singly polarized single plane monopulse signal from the third and fourth apertures.

35. The method of claim 34 further comprising a first monopulse signal fed to the first sum port and wherein a second monopulse signal is fed to the second sum port.

36. The method of claim 32 further comprising supplying a first radar transmit signal to the first hybrid junction, supplying a second radar transmit signal to the second hybrid junction, supplying the first radar signal from the first junction to the first and second feed apertures arranged in the first line on a plane, supplying the second radar signal from the second junction to the third and fourth feed apertures arranged in the second line on the plane, the second line being orthogonally related to the first line and wherein the radiating comprises radiating first radar signals in a first polarization from the first and second feed apertures in a second polarization, radiating a second radar signal from the third and fourth feed apertures, the first and second polarizations being orthogonally related.

37. Dual polarized monopulse apparatus comprising first, second, third and fourth feed apertures arranged in pairs in a plane, the first and second feed apertures being arranged in vertical alignment and the third and fourth feed apertures being arranged in horizontal alignment, means for providing a first singly polarized single plane monopulse radiation pattern from the first and second feed apertures and means for providing a second singly polarized single plane monopulse radiation pattern having a polarization orthogonal to the first pattern from the third and fourth feed apertures, first, second, third and fourth transmission lines being connected respectively to the first and second feed apertures, and the third and fourth transmission lines being connected respectively to the third and fourth feed apertures, first and second hybrids each having hybrid junctions and sum and difference ports, the hybrid junction of the first hybrid being connected to the first and second transmission lines and the hybrid junction of the second hybrid being connected to the third and fourth transmission lines, first sum means connected to the sum port of the first hybrid for receiving sum of signals received by the first and second feed apertures, second sum means connected to the sum port of the second hybrid for receiving a sum of signals received by the third and fourth feed apertures, elevation means connected to the difference port of the first hybrid for receiving the difference of signals received by the first and second feed apertures as an elevation signal, and azimuth means connected to the difference port of the second hybrid for receiving the difference of signals received by the third and fourth feed apertures as an azimuth signal, whereby signals received by the first and second and by the third and fourth feed apertures are summed as sum signals and whereby signals received by the first and second and by the third and fourth feed apertures are differentiated as elevation and azimuth signals respectively.

* * * * *